United States Patent
Chevin et al.

(10) Patent No.: US 7,527,757 B2
(45) Date of Patent: May 5, 2009

(54) METHOD OF PRODUCING POLYIMIDE MATRIX COMPOSITE PARTS

(75) Inventors: Jean-Pierre Chevin, Gainneville (FR); Pascal Eric Jean Marchant, Gainneville (FR)

(73) Assignee: Aircelle, L'Orcher (FR)

( * ) Notice: Subject to any disclaimer, the term of this patent is extended or adjusted under 35 U.S.C. 154(b) by 619 days.

(21) Appl. No.: 10/550,466

(22) PCT Filed: Feb. 9, 2004

(86) PCT No.: PCT/FR2004/000285

§ 371 (c)(1), (2), (4) Date: Sep. 26, 2005

(87) PCT Pub. No.: WO2004/087405

PCT Pub. Date: Oct. 14, 2004

(65) Prior Publication Data

US 2006/0113706 A1     Jun. 1, 2006

(30) Foreign Application Priority Data

Mar. 26, 2003   (FR) .................................. 03 03696

(51) Int. Cl.
  *B29C 70/44* (2006.01)
  *B29C 70/50* (2006.01)
  *B29C 70/46* (2006.01)
(52) U.S. Cl. ........................ 264/258; 264/103; 264/259; 264/279; 264/102
(58) Field of Classification Search ................. 264/103, 264/259, 258, 257, 250, 294, 279; 156/245, 156/242, 313, 60, 63, 71, 79, 89.26, 158; 29/889, 889.23

See application file for complete search history.

(56) References Cited

U.S. PATENT DOCUMENTS

| 4,197,339 A | 4/1980 | Paul et al. |
| 5,104,474 A | 4/1992 | Scola et al. |

(Continued)

FOREIGN PATENT DOCUMENTS

DE     197 23 845 A1     12/1998

(Continued)

*Primary Examiner*—Steven P Griffin
*Assistant Examiner*—Omar Siddique
(74) *Attorney, Agent, or Firm*—Oliff & Berridge, PLC

(57) ABSTRACT

The invention relates to a method of producing rectifier parts which are made from a laminate composite material comprising reinforcing fibers that are embedded in a heat-polymerized polyimide resin matrix. The aforementioned parts comprise an inner platform, an outer platform and at least one solid blade which connects said platforms. The invention is characterised in that it comprises the following steps consisting in: a) producing the essential parts of the platforms, blades and the blade/platform connecting zones as separate structural elements, by stacking or winding layers of reinforcing fibers which have been impregnated with resin and which are used to form said structural elements, with the exception of the outer layers which form at least the boundary wall of the gas stream through the rectifier; b) imidizing separate structural elements; c) assembling said separate imidized structural elements; d) adding the outer layers of reinforcing fibers which have been impregnated with resin in order to form the part; e) placing the part thus produced in a mould/countermould employing compression polymerization; and f) polymerizing the part by subjecting same to compressive stresses.

9 Claims, 5 Drawing Sheets

| U.S. PATENT DOCUMENTS | | | | FOREIGN PATENT DOCUMENTS | | |
|---|---|---|---|---|---|---|
| 5,312,579 A | | 5/1994 | Druyun et al. | FR | 2 760 398 | 9/1998 |
| 5,597,435 A | | 1/1997 | Desautels et al. | | | |
| 5,686,038 A | | 11/1997 | Christensen et al. | | | |
| 6,036,900 A | * | 3/2000 | Munk et al. ............... 264/102 | * cited by examiner | | |

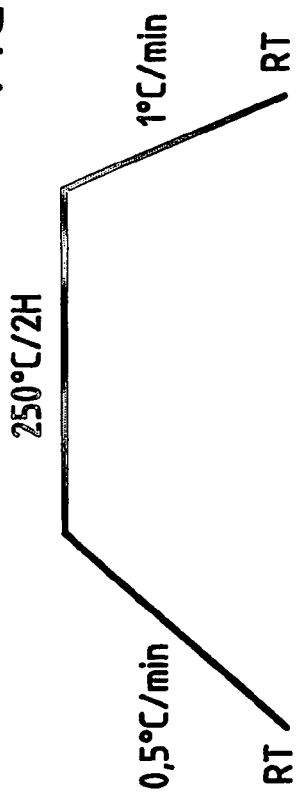
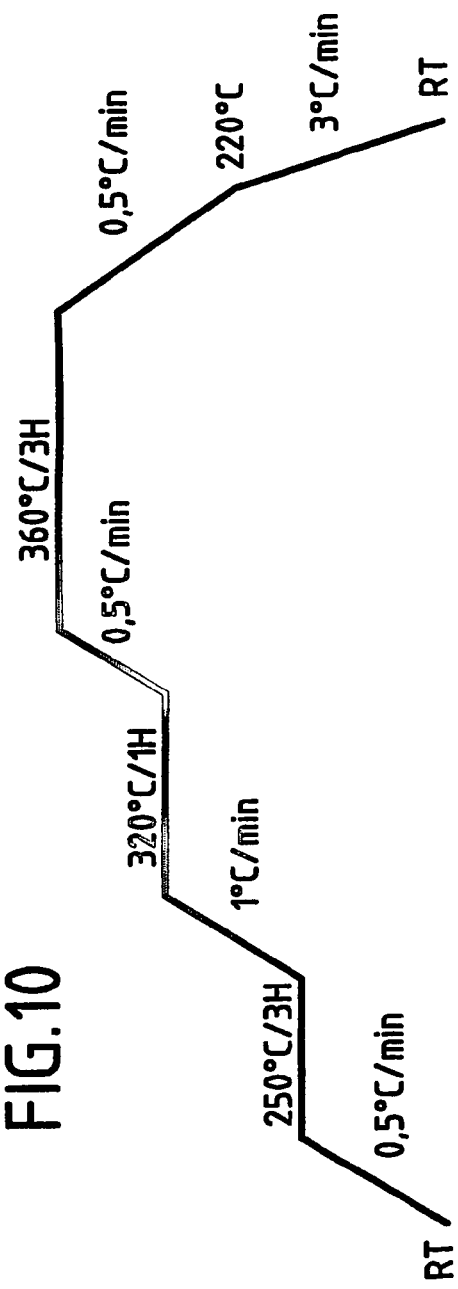

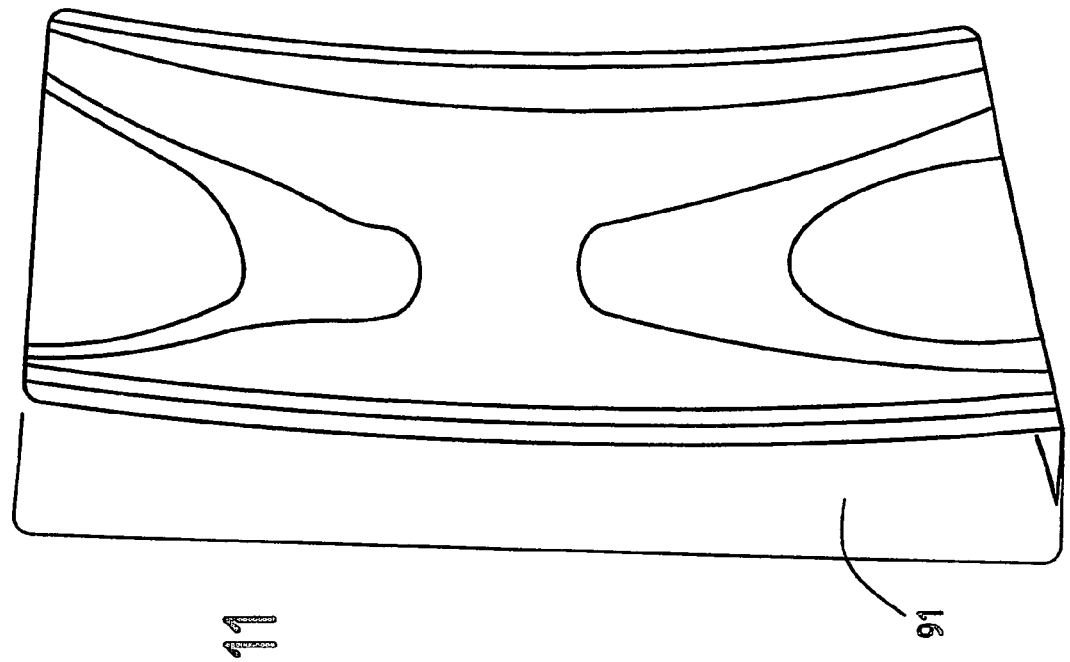
FIG. 11
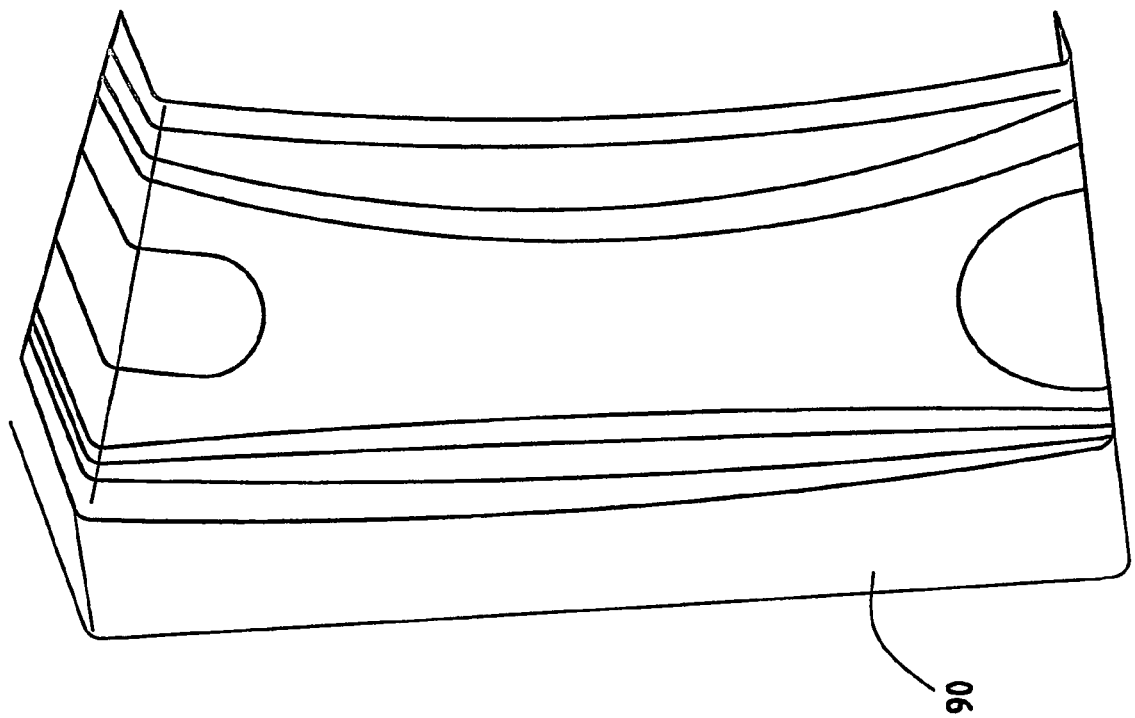

METHOD OF PRODUCING POLYIMIDE MATRIX COMPOSITE PARTS

The invention relates to the field of parts made of a high-temperature-resistant composite, such as the vanes of an inlet guide vane assembly on a turbojet, comprising reinforcing fibers embedded in a heat-curable resin matrix, said parts being able to have an outer platform, an inner platform and at least one full blade connecting said platforms.

Composites based on carbon fibers and a heat-curable resin matrix are being increasingly used for producing parts located in the cold regions of aviation turbomachines, especially those for military use. This is because such composites exhibit excellent mechanical properties and have a much lower density than that of the metal alloys normally used.

The choice of resin type is made in particular according to the temperature to which the part will be subjected under the normal operating conditions of the turbomachine.

The known RTM (resin transfer molding) process consists in placing the reinforcing fibers in a mold having the shape of the finished part, in injecting liquid resin under low pressure into the mold and in curing the resin maintained under pressure. This process allows a variety of different parts to be obtained. However, the organic resins employed with this process are of the epoxy/bismaleimide type and do not have a sufficient temperature resistance for application to these turbomachine parts.

Moreover, organic resins resistant to higher temperatures exhibit insufficient flow before curing.

Therefore either sheets of fabric or unidirectional sheets, that is to say sheets in which the fibers are parallel and held in place relative to one another by the resin, are used to produce the part by drape molding, these fabrics or these fiber sheets being pre-impregnated with a resin resistant to higher temperatures, on specific tools, and the curing operation is carried out in a mold allowing the part to be compressed.

French Application filed under No. FR 97/02 663 proposes a method for producing thin-walled hollow parts made of a laminated composite based on a PMR 15 heat-curable polyimide resin, PMR 15 being a trademark of the company Cytec. This method consists in producing a silicone elastomer core which has the shape of the cavity of the part and can be destroyed at high temperature, in draping the core with at least one layer of prepreg fibers, in placing the core/prepreg-fiber assembly in a mold, in curing the resin under compression and then in demolding and removing the core. The mold comprises a female portion that supports one of the walls of the part and a male portion that supports the other wall and is capable of sliding in the female portion during curing. The compression exerted by the mold during curing, combined with the thermal expansion of the silicone elastomer core, allows the composite to flow in order to reduce the porosity that results from air bubbles trapped between the fiber plies and also the gaseous emissions from the resin during curing, thereby expelling the excess resin and increasing the fiber density.

This method described in the above document applies to thin-walled hollow parts.

As regards the production of engine casings made of a laminated composite, which have an outer platform, an inner platform and at least one full blade that joins said platforms, by curing in a single cycle, the gaseous emissions from the resin during the curing cycle would be too great to allow a satisfactory level of porosity to be achieved in the walls, owing to the large thickness of the walls constituting the blades and the platforms. This would in particular result in a poor surface finish, including that of the walls that define the stream of gas flowing through the guide vanes. Now, the surface finish is a factor that influences the efficiency of the guide vanes, and beyond, of turbomachines.

The amount of volatiles given off depends on the polyimide chosen. Now, for reasons of safety of operators working in manufacturing shops, it is a question of prohibiting the use of PMR 15 resin and of replacing it with other polyimides such as Avimid-R, Avimid-R being a trademark of Cytec, which give off even more volatiles than PMR 15 during curing.

The object of the invention is to propose a method for producing the vanes of inlet guide vane assemblies made of a polyimide-matrix composite, the walls of which, defining in particular the gas stream, exhibit a good surface finish.

The invention is based on the fact that most of the volatile gases are given off during the first temperature-rise phase of the curing cycle, during which phase the monomers combine to form small and mutually independent systems (dimers and trimers), the formation of long and mutually crosslinked chains taking place during the following temperature-rise phase, which is accompanied by volatile gases being given off.

The method according to the invention is characterized by the following steps :
  a) the essential portions of the platforms, of the blades and of the blade/platform connection regions are produced, as separate structural elements, by superposition or winding of the layers of prepreg fibers (reinforcing fibers preimpregnated with resin) that will constitute said structural elements with the exception of the external layers that have to form at least the boundary wall for the stream of gases flowing through the guide vanes;
  b) said separate structural elements are imidized;
  c) said separate imidized structural elements are assembled;
  d) the external layers of prepreg fibers are added in order to form the part;
  e) the part thus formed is placed in a compression curing mold/contermold assembly; and
  f) the part is cured by subjecting it to compressive forces.

The term "imidized" is understood to mean that the separate structural elements are prepolymerized, that is to say said elements are heated according to an established temperature-rise law so as to fix the monomer system without creating covalent chains. During this imidization operation, most of the volatile gases are eliminated.

During step b), the elements to be imidized are placed in suitable molds, which molds allow the gases to be removed, allow the excess resin to flow out, and give the imidized parts their final form.

At the end of the imidization operation, the imidized structural elements may have an imperfect surface finish, which will be rectified during the curing step.

This is because the imidization step gives imidized elements having areas starved of resin essentially on the surface. The addition and curing of the nonimidized prepreg layers makes it possible to moderate, or even eliminate, these flaws.

During the operation of curing the imidized elements that have been assembled and covered with fresh prepreg layers of small thickness compared with the total thickness of the imidized elements, the volatile gases emanate from these nonimidized prepreg layers or are eliminated during the first temperature-rise phase, the excess resin from the external layers fills the pores of the preimidized structural elements which no longer give off any volatiles. During the second temperature-rise phase, which consists in the actual curing of the entire part, that is to say the creation of covalent chains throughout the part, there are almost no more volatile gases given off, and the part is subjected to a high compression. This causes the resin to flow and results in a surface finish that conforms to the external layers added to the imidized structural elements.

Advantageously, the external layers of fresh prepregs are added by draping the pressure side of a blade, and the adjacent portions of the internal faces of the platforms, with first joining prepreg layers and by draping the suction side of a blade, and the adjacent portions of the internal faces of the platforms, with second joining prepreg layers.

Thus, after curing under compression, these prepreg layers form plies exhibit excellent surface finish and greatly stiffening the part produced.

Other advantages and features of the invention will emerge on reading the following description given by way of example and with reference to the appended drawings in which:

FIG. 9 shows the temperature curve during the imidization operation;

FIG. 10 shows the temperature curves during the curing operation; and

FIG. 11 shows the layers of fresh material to be added to the pressure and suction sides of the blades.

FIGS. 1 and 2 show a one-piece compressor guide vane sector 1 of an aviation turbomachine, made of a laminated composite comprising reinforcing fibers embedded in a heat-cured resin.

Figure 2:
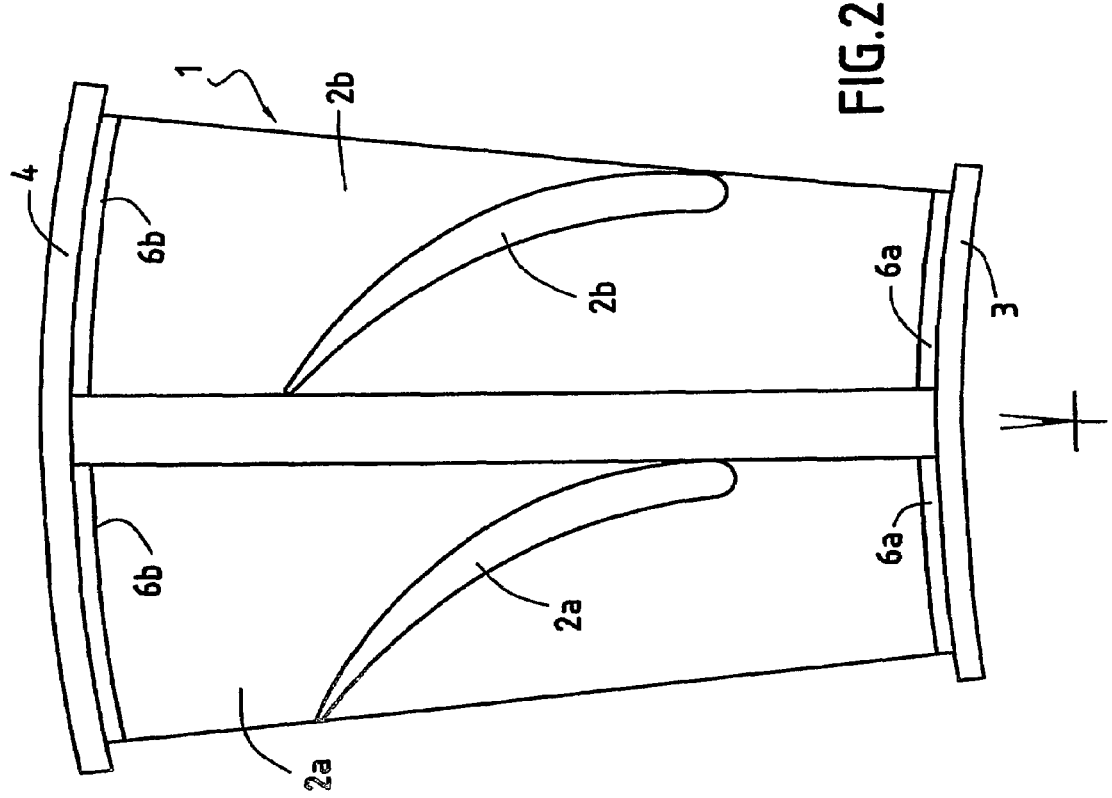
FIG. 2 is a front view of the sector of FIG. 1.

This section 1 has two blades 2a and 2b that extend radially between an inner platform 3 and an outer platform 4. The upstream edge 4a and downstream edge 4b of the outer platform 4 have a smaller thickness than the central portion of this platform 4.

The upstream edge 3a and downstream edge 3b of the inner platform 3 have a smaller radial dimension than that of the central portion.

The references 6a and 6b denote the regions where the blades 2a, 2b are joined to the inner and outer platforms 3, 4.

According to the present invention, the sector 1 is made from several separate structural elements by superposition or winding of unidirectional plies of fabrics of reinforcing fibers, especially carbon fibers, pre-impregnated with a heat-curable organic resin, especially a polyimide resin resistant to temperatures of around 300° C.

Figure 1:
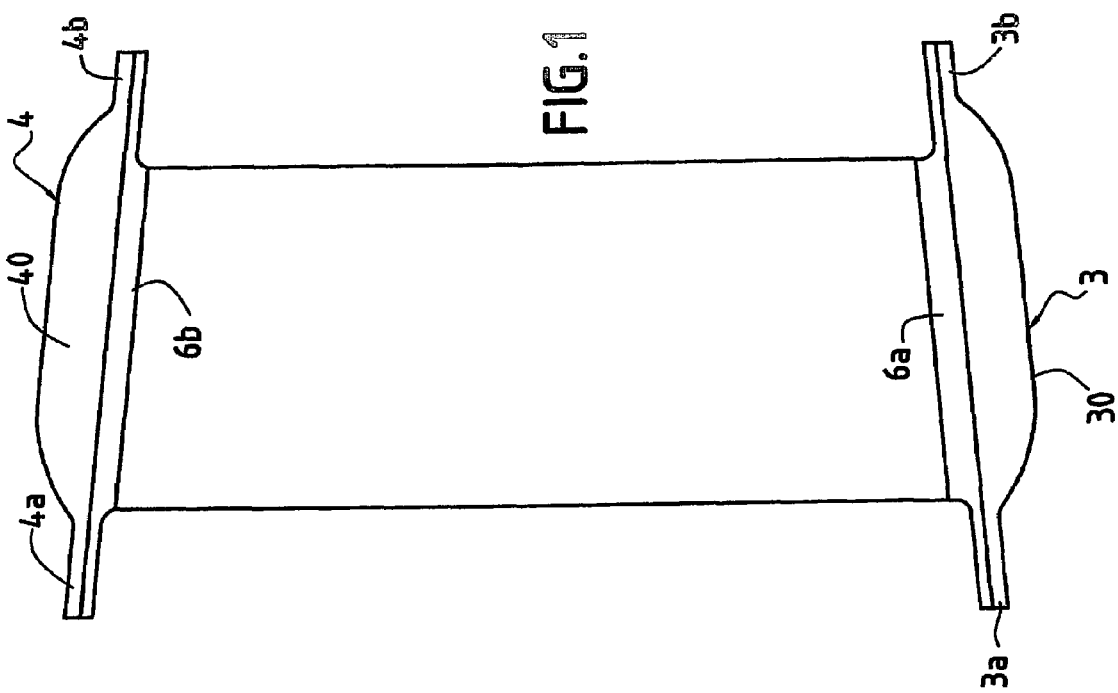
FIG. 1 is a cross section through a sector of an inlet guide vane assembly in a plane containing the axis of a turbomachine.

The outer platform 4 is thus produced from a structural element with the reference 40 in FIG. 1.

The inner platform 3 is produced from a structural element with the reference 30.

Figure 3:
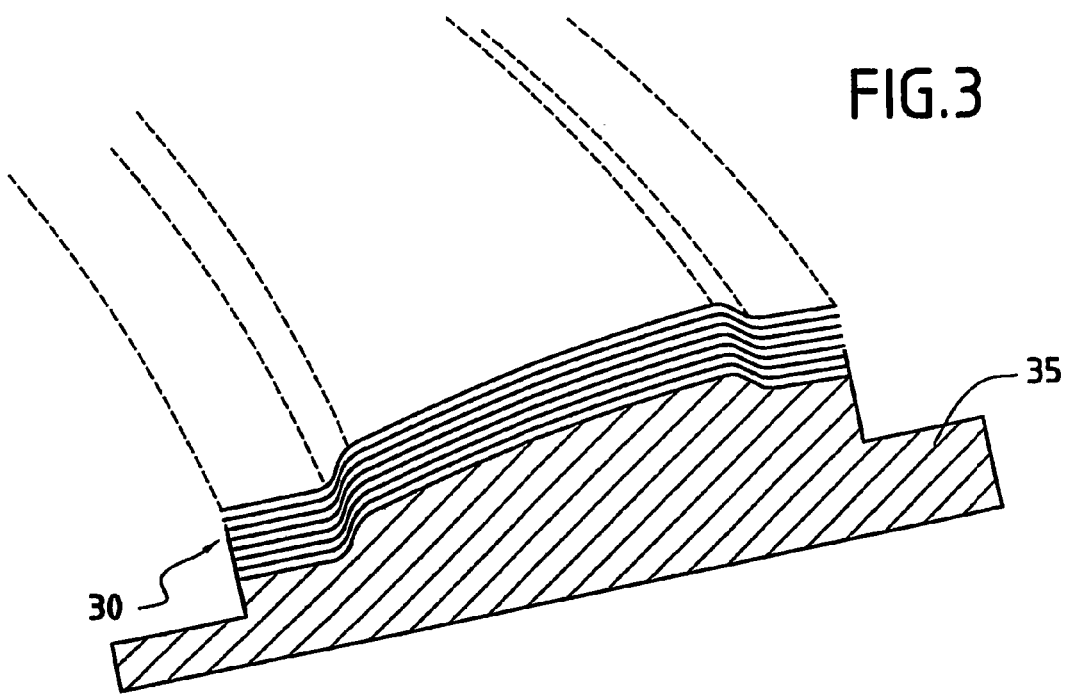
FIGS. 3 and 4 show, respectively, the tools and the stacking of prepreg layers in order to produce the essential structural portions of the inner and outer platforms.
Figure 4:
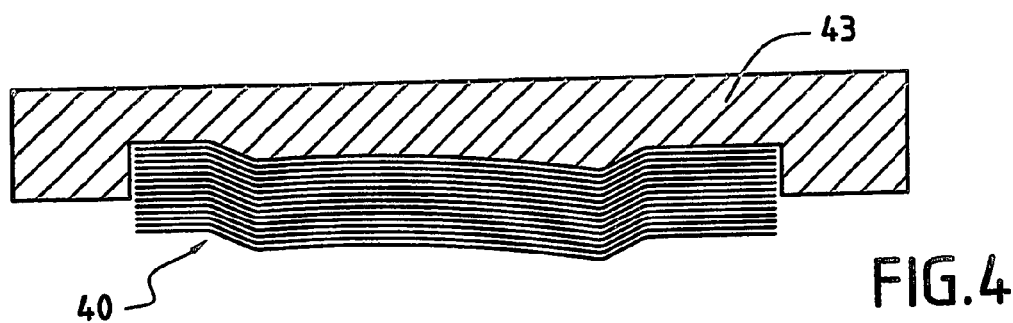

The main portions 30 and 40 of the inner and outer platforms 3 and 4 are produced in a conventional manner by the stacking, pressing and bonding of parts precut from a roll of fabric or sheet preimpregnated with resin, on the tools with the references 35 and 43 in FIGS. 3 and 4. Several prepreg fabric pieces form the structural element 30 and the structural element 40. The number of fabric pieces forming each structural element 30 or 40 is chosen according to the strength and thickness desired. The reinforcing fibers of each fabric piece are placed either along the axial direction, or in the circumferential direction, or at 45° to them, the directions of the fibers being specified in a precise operating instruction.

The tools with the references 35 and 43 in FIGS. 3 and 4 are male parts of imidization molds, the female parts of which are not shown in the drawings.

Figure 5:
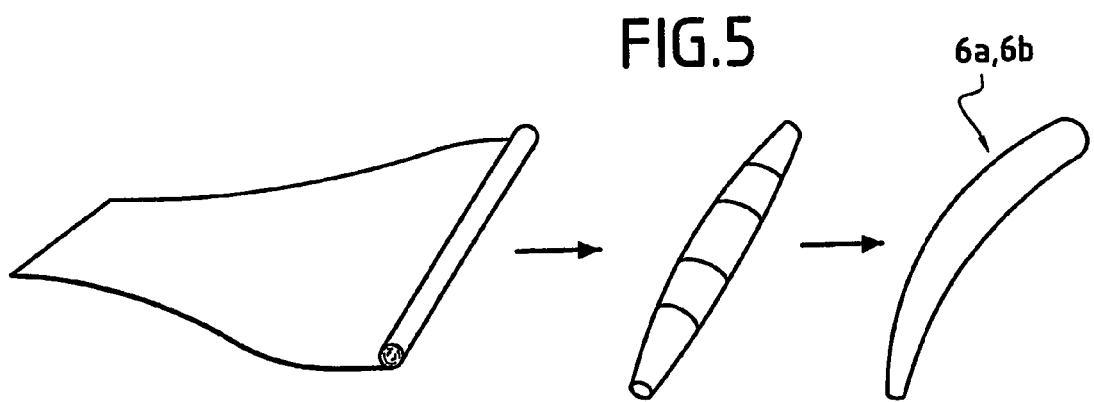
FIG. 5 shows the production of a blade/platform join using a strip of prepreg.
Figure 6:
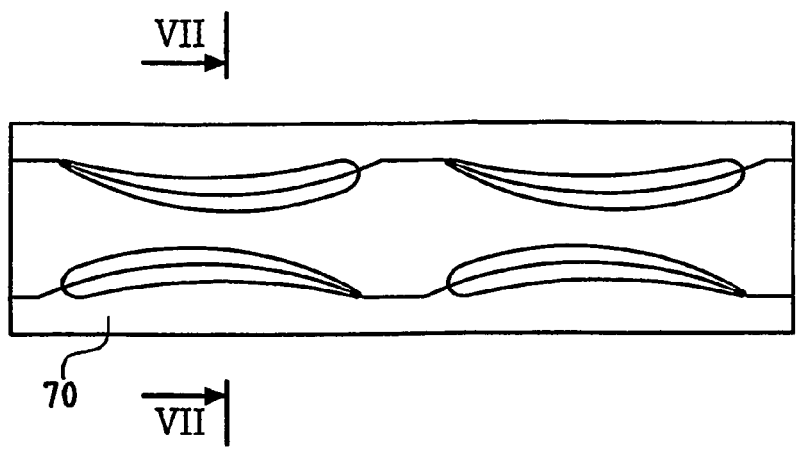
FIG. 6 shows the tools used to imidize the blade/platform joins.
Figure 7:
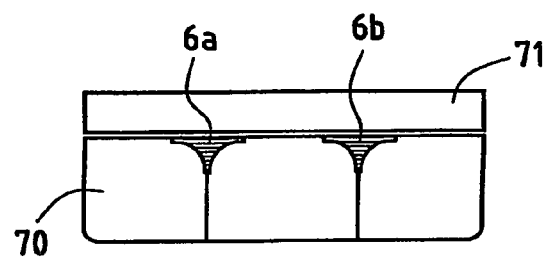
FIG. 7 is a cross section on the line VII-VII of FIG. 6.
Figure 8:
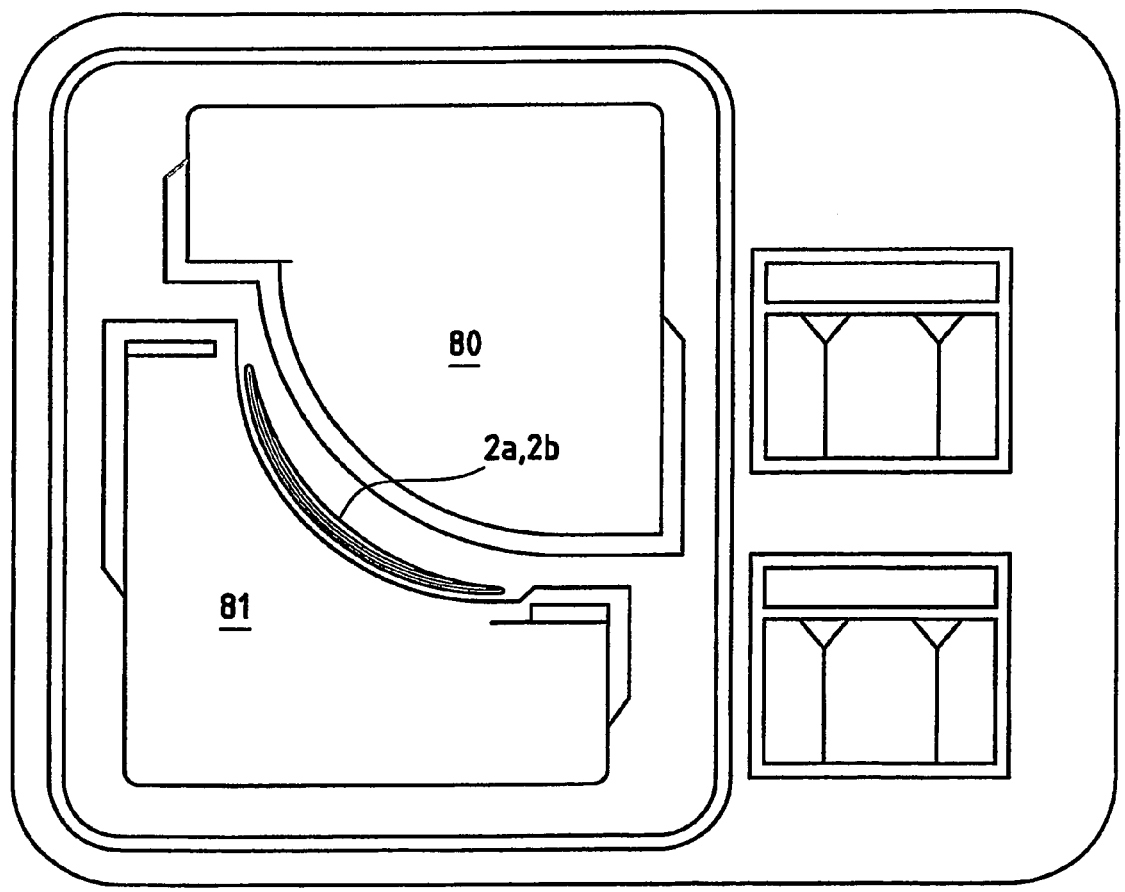
FIG. 8 shows the arrangement of the various tools in a bladder made of polyimide film, especially "Kapton" film, "Kapton" being a trademark of DuPont.

The blade/platform join regions, with the references 6a, 6b in FIG. 2, on the pressure side and suction side, are also made in the form of separate structural elements. As shown in FIG. 5, each of these join regions is produced by rolling a strip of prepreg fabric in the direction transverse to the direction of the fibers, this strip being placed in the impression of a suitable mold 70 visible in FIGS. 9 and 10, and having a cover 71.

The core of the blades 2a, 2b is also produced by stacking strips of fresh prepreg fabric or sheet and is placed between a pressure side tool 80 and a suction side tool 81, so as to constitute separate structural elements as shown in FIG. 2.

The separate structural elements 30, 40, the blade/platform join regions 6a, 6b and the core of the blades 2a and 2b are placed tightly in their tools, as was described above. These tools include felts for extracting the volatile gases and for flow of the resin. All the tools are placed in one and the same polyimide bladder, such as a "Kapton 82" film, "Kapton" being a trademark of DuPont, and then all the separate structural elements constituting a sector 1 are imidized in an autoclave.

The autoclave imidization cycle depends on the type of resin used.

For polyimides, the temperature is raised, for example, from 20° C. to 250° C. at a rate of 0.5° C./min and then maintained at a temperature of 250° C. for a period of 120 minutes. After cooling at a rate of 1° C./min, the parts are demolded when the temperature reaches 40° C. A relative vacuum of −50 mbar is maintained in the bladder throughout the duration of the imidization cycle. FIG. 9 shows the temperature curve as a function of time.

During the imidization cycle, the monomer system is converted in particular into a system of dimers and trimers. About 80% of the volatile gases are removed during this step.

When the separate structural elements have been immiodized and demolded, they are assembled in a specific tool by placing a piece of prepreg fabric or sheet between two adjacent structural elements, especially between the portion 40 of the outer platform 4, or the portion 30 of the inner platform 3, and the join regions 6a, 6b of the platforms and cores of the blades 2a, 2b.

Next, external plies of fresh material are draped over the pressure and suction faces of the imidized cores of the blades 2a, 2b and over the facing surfaces of the inner and outer platforms 3, 4. To do this, plies of prepreg fabric 90, 91 precut to the correct dimensions are placed on specific tools, as shown in FIG. 11.

A nonstick film is placed on the drape tools before the first plies are placed thereon.

The drape tools are elements of a mold for the curing under high compression of the sector 1 consisting of the separate imidized and assembled structural elements and of the fresh prepreg sheets placed between the various elements and covering those faces of the sector 1 that have to define the stream of gas that will flow through the sector 1 during operation of the compressor comprising an inlet guide vane assembly produced from this type of sector.

During the step of imidizing the separate structural elements, most of the volatiles have been removed.

During the step of curing the sector 1, only the fresh prepreg sheets will give off volatile gases at the start of the curing cycle. Since these "fresh" prepreg sheets cover a large area of imidized elements, which may be porous, the liquefied resin of the fresh prepreg sheets or fabrics will fill these pores.

The temperature-rise curves during curing depend on the resin used. If this is a polyimide resin, as shown for example in FIG. 10, the temperature is made to climb from 20° C. to 250° C. at a rate of 0.5° C./min, this 250° C. temperature is then maintained for 3 hours, followed by a further temperature rise from 250° to 320° C. at a rate of 1° C./min. The temperature is maintained at 320° C. for 1 hour and finally the temperature is raised to 360° C. at a rate of 0.5° C./min followed by a hold for 3 hours at 360° C. The cooling takes place in two phases having different cooling rates.

During the first cooling phase, the temperature is lowered by 0.5° C./min until a temperature of 220° C. is reached, while during the second cooling phase the temperature is lowered at a rate of 3° C./min.

At the start of the step of imidizing the fresh prepreg fabric plies, that is to say during the first phase of the curing step, the part is not subjected to any compressive force.

At the end of imidizing the added layers, the part is increasingly compressed so that it reaches a pressure level (for example 35 bar) sufficient to ensure good curing, when the temperature of the part reaches 310° C. This level of compression is maintained right to the end of cooling.

This very high level of compression makes it possible for the boundary walls for the gas stream to have an excellent surface finish.

A relative vacuum of −50 mbar is maintained throughout the duration of the curing cycle.

The invention claimed is:

1. A method of producing a part made of a high-temperature-resistant composite, said composite comprising reinforcing fibers embedded in a heat-cured polyimide resin matrix, said part having an inner platform, an outer platform and at least one full blade connecting said platforms, characterized by the following steps:
    a) essential portions of the platforms, of the blades and of the blade/platform connection regions are -produced, as separate structural elements, by superposition or winding layers of prepreg fibers; with the exception of external layers that have to form at least a boundary wall for flowing streams of gas through guide vanes;
    b) said separate structural elements are introduced into an imidization cycle;
    c) said separate imidized structural elements are assembled;
    d) the external layers comprising prepreg fibers are added to a pressure and suction side of the blade in order to form the part;
    e) the part thus formed is placed in a compression curing mold/contermold assembly; and
    f) the part is cured by subjecting it to compressive forces.

2. The method as claimed in claim 1, wherein the external layers comprising prepreg fibers are added by draping a pressure side of a blade, and the adjacent portions of the faces that face the platforms, with first joining prepreg layers and by draping a suction side of a blade, and the adjacent portions of the faces that face the platforms, with second joining prepreg layers.

3. The method as claimed in claim 2, wherein the structural elements are imidized by heating them at 0.5° C./min with an intermediate hold for 120 minutes at 250° C. before cooling.

4. The method as claimed in claim 2, wherein the part is subjected to a compression of 35 bar when its temperature reaches 310° C., and this compression is maintained until the end of the curing.

5. The method as claimed in claim 1, wherein the structural elements are imidized by heating them at 0.5° C./min with an intermediate hold for 120 minutes at 250° C. before cooling.

6. The method as claimed in claim 5, wherein the structural elements are subjected to a relative vacuum of −50 mbar throughout the duration of the imidization cycle.

7. The method as claimed in claim 6, wherein the part is subjected to a compression of 35 bar when its temperature reaches 310° C., and this compression is maintained until the end of the cooling.

8. The method as claimed in claim 5, wherein the part is subjected to a compression of 35 bar when its temperature reaches 310° C., and this compression is maintained until the end of the cooling.

9. The method as claimed in claim 1, wherein the part is subjected to a compression of 35 bar when its temperature reaches 310° C., and this compression is maintained until the end of the curing.

* * * * *